United States Patent
Onno et al.

(10) Patent No.: US 7,861,294 B2
(45) Date of Patent: Dec. 28, 2010

(54) PRESENCE-BASED ACCESS CONTROL

(75) Inventors: Stéphane Onno, Saint Gregoire (FR); Alain Durand, Rennes (FR); Eric Diehl, Liffre (FR)

(73) Assignee: Thomson Licensing, Bologne Billancourt (FR)

( * ) Notice: Subject to any disclaimer, the term of this patent is extended or adjusted under 35 U.S.C. 154(b) by 1371 days.

(21) Appl. No.: 11/337,767

(22) Filed: Jan. 23, 2006

(65) Prior Publication Data

US 2007/0192851 A1 Aug. 16, 2007

(30) Foreign Application Priority Data

Jan. 24, 2005 (EP) ................... 05100426

(51) Int. Cl.
*G06F 21/20* (2006.01)
(52) U.S. Cl. ............... 726/20; 726/9; 726/16; 726/17; 713/168; 713/172
(58) Field of Classification Search ............... None
See application file for complete search history.

(56) References Cited

U.S. PATENT DOCUMENTS

| | | | |
|---|---|---|---|
| 5,659,616 A | 8/1997 | Sudia | |
| 6,572,015 B1 * | 6/2003 | Norton | ............ 235/382 |
| 6,598,032 B1 | 7/2003 | Challener et al. | |
| 7,215,237 B1 | 5/2007 | Messerschmid | |
| 7,350,230 B2 * | 3/2008 | Forrest | ............ 726/9 |
| 2002/0095587 A1 * | 7/2002 | Doyle et al. | ............ 713/186 |
| 2003/0046542 A1 * | 3/2003 | Chen et al. | ............ 713/176 |
| 2004/0148510 A1 | 7/2004 | Muller et al. | |

FOREIGN PATENT DOCUMENTS

| | | |
|---|---|---|
| EP | 1 139 200 A2 | 10/2001 |
| EP | 1 349 032 A1 | 10/2003 |
| WO | WO 02/21763 A1 | 3/2002 |
| WO | WO 2004/031920 A1 | 4/2004 |

OTHER PUBLICATIONS

European Search Report.

* cited by examiner

*Primary Examiner*—Jung Kim
(74) *Attorney, Agent, or Firm*—Robert D. Shedd; Paul P. Kiel (57) ABSTRACT

To access services on a device, such as a computer, a user has a portable device in two parts: a plug adapted to be inserted in a USB port and a transponder that remains about his person. In a preferred embodiment, an access manager verifies that first the plug and then the transponder are identified. If so, the access manager verifies if plug and transponder have to be paired and if they have the proper access rights for the desired service. Only then is access given. In a further embodiment, more than one transponder is needed to access a certain service. It can thus be appreciated that the invention provides a flexible and secure way to secure access to services.

17 Claims, 6 Drawing Sheets

PRESENCE-BASED ACCESS CONTROL

This application claims the benefit, under 35 U.S.C. §119 of EPO Patent Application 05100426.5 filed Jan. 24, 2005.

FIELD OF THE INVENTION

The present invention relates generally to access control, and in particular to access control to devices in networks controlled by an access manager.

BACKGROUND OF THE INVENTION

In computer networks, access control has long been of primary concern. Solutions to this problem fall into one of at least two, sometimes overlapping, categories: protecting access to content stored in the network, and protecting access to the terminals and/or computers themselves.

Among the solutions in the first category—protecting access to content—are:
- access rights for files on the network, i.e. a certain user may be allowed access to some files, but not others; and
- encrypted files to avoid hacking.

The invention, however, is directed to the second category—protecting access to the computers—in which some prior art solutions are:
- demanding a password for a user to be able to access the computer;
- smart card readers that require the presence of a smart card for the user to access the computer;
- biometric security, such as for example demanding that the user identify himself through a fingerprint. One such solution is the DEFCON™ Fingerprint Authenticator™ that is connected to a USB (Universal Serial Bus) and is used instead of a password; and
- DeviceLock® enables the administrator to decide which interfaces—for example USB ports, Bluetooth adapters, and CD-ROM drives—that can be used by a user.

The prior art solutions do have some inherent problems. Passwords are often written down so that the user will not forget them, or easily guessed, such as the name of the user's pet or child. In addition, it is frequent that a user forgets to lock the computer, for example when getting print-outs. This leaves the way open for persons who should not have access to the computer, at least as that particular user.

Smart card readers suffer one of the problems of passwords, to wit: a user often tends not to remove his smart card when for example getting print-outs. This too leaves the way open for persons who should not have access to the computer, at least as that particular user.

Biometric solutions also suffer from this problem. In the fingerprint example, the user shows that he has the correct fingerprint, but he is not obliged to keep his finger on the detector. As before, this too leaves the way open for persons who should not have access to the computer, at least as that particular user.

While DeviceLock® does protect interfaces, it still suffers from the problem that access is given for a certain user, even though that user may not actually be present, owing for example to a visit to the printer where he can be forced to spend quite some time in case of printer malfunction, lack of paper or toner, and so on.

It can therefore be appreciated that there is a need for a flexible solution that enables access control, particularly to interfaces, that overcomes problems of the prior art. This invention provides such a solution.

SUMMARY OF THE INVENTION

In a first aspect, the invention is directed to a system for controlling access to a service on a device in the system that further comprises an access manager, a plug, and a transponder. The transponder is adapted for communication with the plug and the plug is adapted for insertion in the device. The access manager is adapted to provide access to the service upon successful verification that: the plug is inserted in the device, that the transponder is in presence of the plug, that the plug is authorised for access to the service, and that the transponder is authorised for access to the service.

In a further preferred embodiment, the plug and the transponder are paired.

In another preferred embodiment, the transponder and the plug are adapted to be carried upon a user without encumbrance or bother to the user.

It is advantageous that the transponder and the plug are adapted to be joined securely, and easily separated once thus joined.

In yet another preferred embodiment, the transponder is in presence of the plug as long as the plug repeatedly receives a signal from the transponder before a specified time interval lapses.

It is advantageous that the transponder sends a signal to the plug in response to a request from the plug.

It is also advantageous that the signal sent from the transponder to the plug is a radio signal.

In yet another preferred embodiment, the transponder comprises an identification interface that requires user identification before communication with the plug.

In yet another preferred embodiment, the plug comprises an identification interface that requires user identification before communication with the transponder and/or the access manager.

In yet another preferred embodiment, the plug is adapted to provide the verification of the presence of the transponder to the access manager.

In yet another preferred embodiment, the access manager is adapted to verify the presence of a plurality of authorised transponders before providing access to the service.

In a second aspect, the invention is directed to a method for controlling access to a service on a device in a system that further comprises an access manager, a plug, and a transponder. The transponder is adapted for communication with the plug. The access manager verifies that the plug is inserted in the device, that the transponder is in presence of the plug, that the plug is authorised for access to the service, and that the transponder is authorised for access to the service. Upon successful verification, the access manager provides access to the service.

In another preferred embodiment, the plug provides the verification that the transponder is in presence of the plug to the access manager.

In yet another preferred embodiment, the transponder requires user identification before establishing presence with the plug.

In yet another preferred embodiment, the plug requires user identification before detecting presence of the transponder.

In a third aspect, the invention is directed to an access manager for controlling access to a service on a device in a system that further comprises a plug and a transponder. The access manager is adapted to verify that the plug is inserted in the device, that the transponder is authorised for access to the service, that the plug is authorised for access to the service, and that the transponder is in presence of the plug. The access manager is further adapted, upon successful verification, to provide access to the service.

In another preferred embodiment, the access manager is adapted to receive from the plug verification that the transponder is in presence of the plug.

In yet another preferred embodiment, the access manager is adapted to verify the presence of a plurality of authorised transponders before providing access to the service.

BRIEF DESCRIPTION OF THE DRAWINGS

Preferred features of the present invention will now be described, by way of example, with reference to the accompanying drawings, in which.

PREFERRED EMBODIMENT OF THE INVENTION

Figure 1:
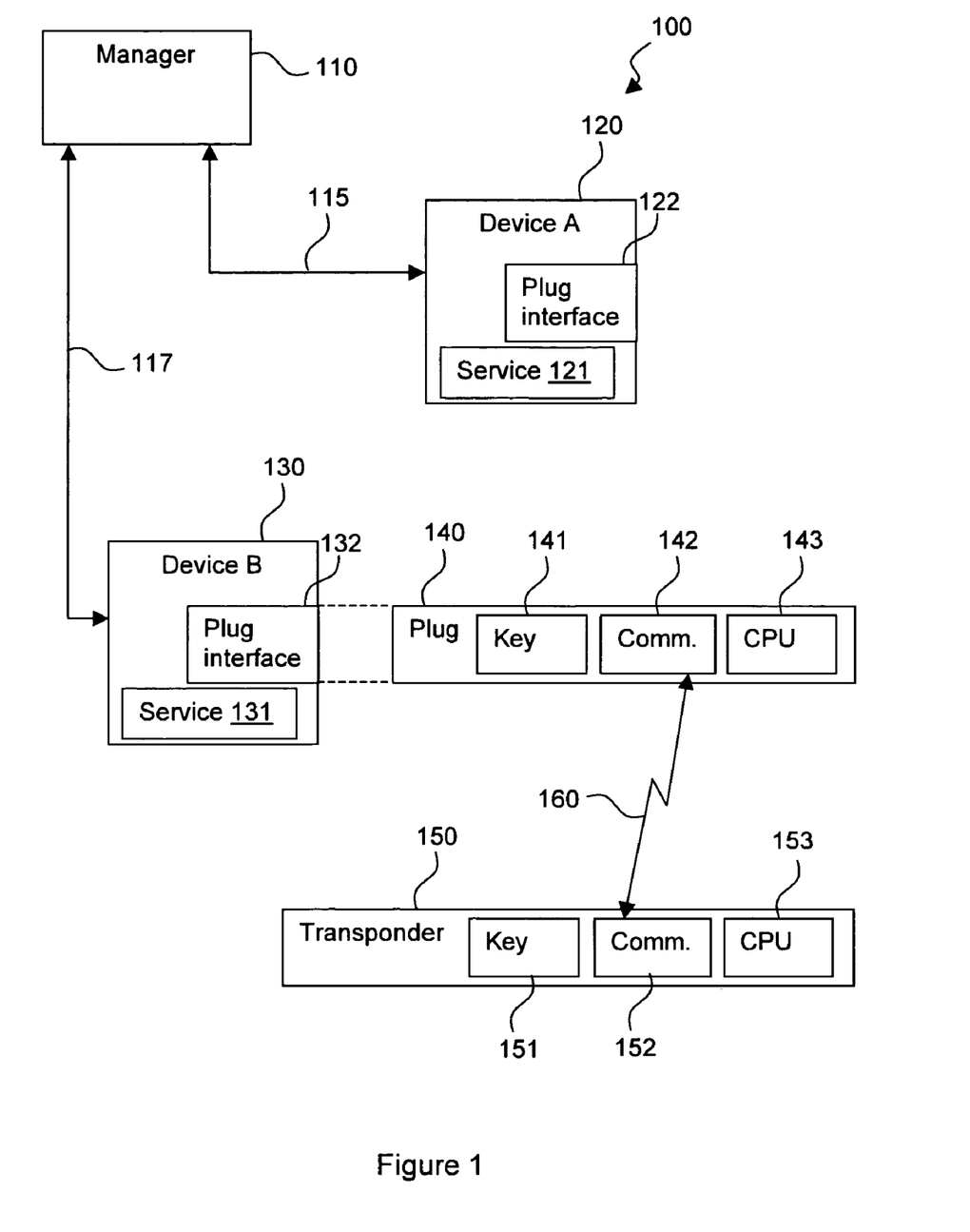
FIG. 1 illustrates a system for presence-based access control according to the invention.

FIG. 1 illustrates a system for presence-based access control according to the invention. The system 100 comprises an access manager 110, a device A 120, a device B 130, a so-called plug 140, and a transponder 150.

In the system 100, the access manager 110 is responsible for allocating access rights to services 121, 131 for users. A service 121, 131 to which a user has access rights is called an allowed service, which indicates what a certain user is allowed to do with the corresponding device 120, 130. A service 121, 131 may for example be the use of a USB port, access to a certain directory, and the use of the device as such. It should be noted that a certain user's allowed services may differ from one device to another, that different users may have different access rights for one or more devices, and that the access rights may be restrictive—i.e. a user only has the access rights he has been specifically allocated; everything else is forbidden—or permissive—i.e. only the services specifically forbidden to a user are not allowed; the user has access to everything else.

A device, such as device A 120 and device B 130, may for example be a personal computer or a workstation, although it is not in any way limited to these embodiments. According to the invention, a device 120, 130, comprises at least one plug interface 122, 132 for interfacing with a plug 140 as will be seen hereinafter, and at least one service 121, 131 that a user may wish to access.

The plug interface 122, 132 is adapted to interface with a plug 140 that in a preferred embodiment is inserted into the plug interface 122, 132. The plug 140 comprises a plug key 141, a processor 143 and a communication unit 142, of which the latter is for communication with a communication unit 152 in the transponder 150 that also comprises a transponder key 151 and a processor 153.

The plug key 141 and the transponder key 151 may be used to encrypt the communication between the plug 140 and the transponder 150. The keys 141, 151 may also be used to ensure pairing between the devices 140, 150 according to any of the methods known in the art. Furthermore, the keys 141, 151 may be used when communicating with the manager 110.

A plug 140 may take different forms or user modes. A generic plug has no specific features and may connect with any transponder. A standard plug is identified by the access manager 110. A paired plug is paired with one or more transponders and will only connect with the or these transponders, which means that a user needs both the plug and the (or at least one) transponder it is paired with.

The transponder 150 is preferably an apparatus that is small enough for the user to carry with him all the time without being encumbered or bothered by it. It may for instance be carried on a key ring together with his keys, attached to his badge, or even be the badge.

A transponder 150 is said to be in the presence of a plug 140 if there is an established, preferably electro-magnetic (particularly radio), connection 160 between them; conversely, absence is when there is no connection between the plug 140 and the transponder 150. An exemplary way of verifying if the transponder 150 is in presence of the plug 140 is for the plug 140 to set a timer and wait for a signal from the transponder 150. If the signal reaches the signal before the timer lapses, then the transponder 150 is in presence of the plug 140; if not, the transponder 150 is absent. The plug 140 preferably repeats this process (not necessarily setting the timer to the same value), for example until it is removed. The plug 140 may also request that the transponder 150 send a signal in response to indicate its presence, preferably using the timer to set a limit for the response.

The states, "presence" and "absence" (also called "present" and "absent", respectively) are called transponder states. The maximum range of the connection depends on the implementation, but in a preferred embodiment, this range is limited to around three metres in an environment that is relatively clear of obstacles. It should be noted that the communication between the transponder 150 and the plug 140 need not be continuous for "presence" to be established. In some embodiments it is sufficient for the transponder to send a signal to the plug at intervals that may be regular or irregular, such as for example once every five seconds on the average.

Prior to use, the access manager 110 identifies devices 120, 130, services, transponders 150, plugs 140 (except generic plugs), and any pairing relationships between transponders and plugs. It does this in order to be able to assign access rights properly.

At this stage, the access manager 110 preferably grants rights to each transponder 150 in a service access list, as follows:
the devices to which the transponder has access;
for each of these devices:
the plugs that are authorised;
for each authorised plug:
whether the transponder needs to be paired with the plug; and
the allowed services.

As will be further described hereinafter, the elements described hereinbefore have the following relationships:
a plug 140 is inserted in a device 120, 130;
the plug 140 detects the presence or absence of the transponder 150;

the plug 140 sends the transponder state to the device 120, 130 that forwards the state to the access manager 110; the access manager 110 authenticates the transponder 150 and grants or denies access to the service 121, 131 of the device 120, 130; and
the plug 140 regularly verifies that the transponder 150 is present.

In order to verify the presence of the transponder, the plug 140 may for example verify regularly that it receives a signal from the transponder before a predetermined time period lapses, but it may also, depending on the implementation, request that the transponder respond with a signal to indicate its presence.

Depending on the form of the plug, as previously described, the following relationships may be added:
the access manager 110 authenticates the plug 140; and
the plug 140 may filter transponder states, which is to say that for example a paired plug may only send transponder states about the transponder or transponders with which it is paired.

Figure 2:
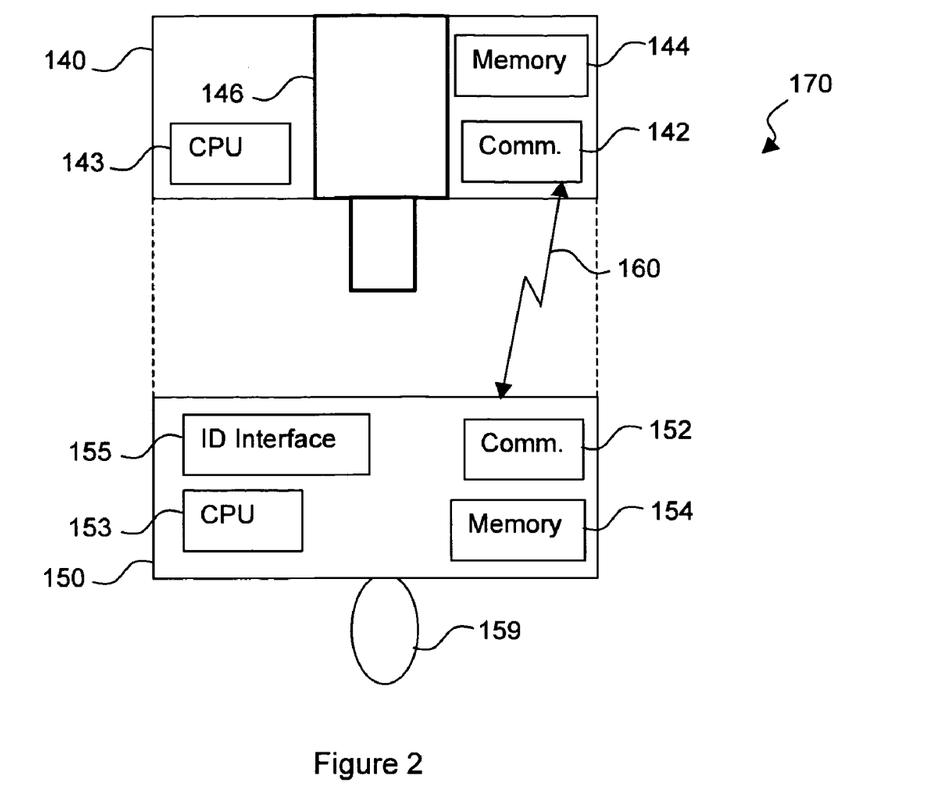
FIG. 2 illustrates schematically an exemplary embodiment of a transportable security apparatus according to the invention.

FIG. 2 illustrates schematically an exemplary embodiment of a transportable security apparatus according to the invention. The transportable security apparatus 170 comprises two parts: a plug 140 and a transponder 150. In a preferred embodiment, the plug 140 and the transponder 150 may be joined securely to form the apparatus 170 that is easy for a user to transport, but they may also be easily separated so that the plug 140 may be plugged into a device 120, 130 while the transponder 150 stays with the user.

Figure 3:
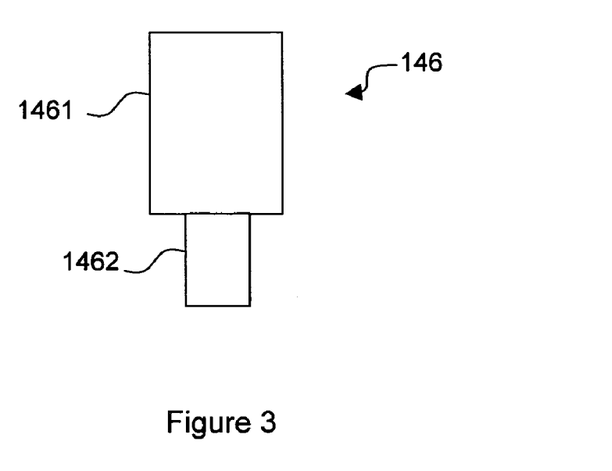
FIG. 3 illustrates an embodiment of a USB plug part of a plug according to the invention.

The plug 140 comprises the communication unit 142 and the processor 143 previously described, a memory 144 for storing the plug key 141, and a USB plug 146 that is adapted to be plugged into the USB port (not shown) of a device 120, 130, and will be further described in FIG. 3.

The transponder 150 comprises the communication unit 152 and the processor 153 previously described, and a memory 154 for storing the transponder key 151.

In a preferred embodiment the transponder 150 further comprises an identification interface 155. In this embodiment, the transponder 150 requires user activation, comprising some kind of identification, to work. The identification may for example be biometric—e.g. using fingerprints or retinal scans—or through the use of a password. The user identification is preferably valid until the plug is removed. In addition, the user identification information may be forwarded to the server for further validation. It should be noted that the identification interface 155 may also be physically located in the plug 140.

An exemplary application of the preferred embodiment is a Virtual Private Network (VPN) secure connection. To connect to a VPN, a user enters a Personal Identification Number (PIN) and an ephemeral value given by a secure token. In the preferred embodiment the ephemeral value is given by the transponder, which sends the value to the server once the user is identified as detailed hereinbefore.

In a further preferred embodiment, the transponder 150 further comprises a fastening device 159, such as for example a metal ring, adapted to attach the transponder 150 or transportable security device 170, as appropriate, to an item normally carried by the user, such as a key ring.

The communication units 142, 152 are preferably capable of two-way communication. In an alternative embodiment, however, the communication unit 152 of the transponder 150 is a transmitter and the communication unit 142 of the plug 140 is a receiver. In the latter embodiment, any communication goes in the direction from the transponder 150 to the plug 140.

FIG. 3 illustrates an embodiment of a USB part according to the invention. The USB plug 146 comprises a body 1461, and a connector 1462 adapted to plug the USB plug 146 into a USB port of a device (not shown).

Figure 4:
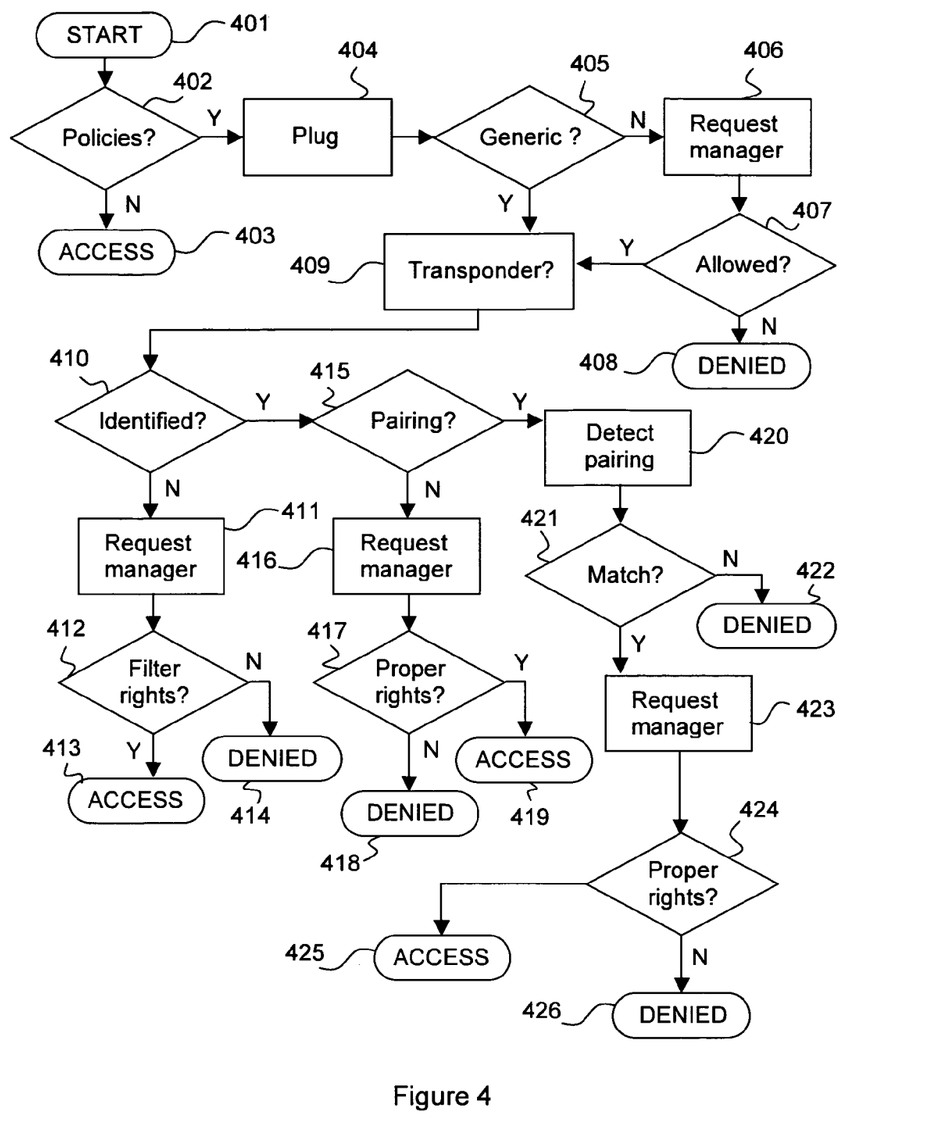
FIG. 4 illustrates a flow chart of an embodiment of a method according to the invention.

FIG. 4 illustrates a flow chart of an embodiment of a method according to the invention in which a user wishes to access a service on a device. After starting the method in step 401, it is verified if there are any access right restrictions for the services on the device; step 402. If not, access is given in step 403, since there are no access restrictions for the services. However, if there are some restrictions, then the method waits for a plug to be inserted; step 404.

In step 405, it is verified if the plug is generic. If this is not the case, the access manager is requested in step 406 to verify if the plug is allowed for the device; step 407. If not, access is denied in step 408, since the plug is not authorised for the device. On the other hand, if the plug is allowed (in step 407) or if the plug is generic (in step 405), the method proceeds to detect a transponder in step 409.

In step 410, it is verified if the transponder is identified. If this is not the case, the access manager is still contacted in step 411 to see if it filters access rights; step 412. If the access manager does not filter access rights, access is denied in step 414; an identified transponder is needed for access. However, if the access manager does filter access rights, access is provided in step 413 to services for which no specific rights are needed.

If the transponder is identified (in step 410), it is verified in step 415 if pairing is needed for access. If not, the access manager is contacted in step 416 to verify if the transponder is allowed to access the service (i.e. if it has the necessary access rights); step 417. If the transponder is allowed access, this is given in step 419; otherwise access is denied in step 418.

If it was determined in step 415 that pairing is required, then pairing is detected in step 420. If there is no match in step 421 (i.e. the plug and the transponder are not properly paired), then access is denied in step 422. However, if the plug and transponder are paired properly, then the access manager is contacted in step 423 to verify in step 424 if the transponder has the proper rights. If the transponder is allowed access, this is given in step 425; otherwise access is denied in step 426.

Figure 5:
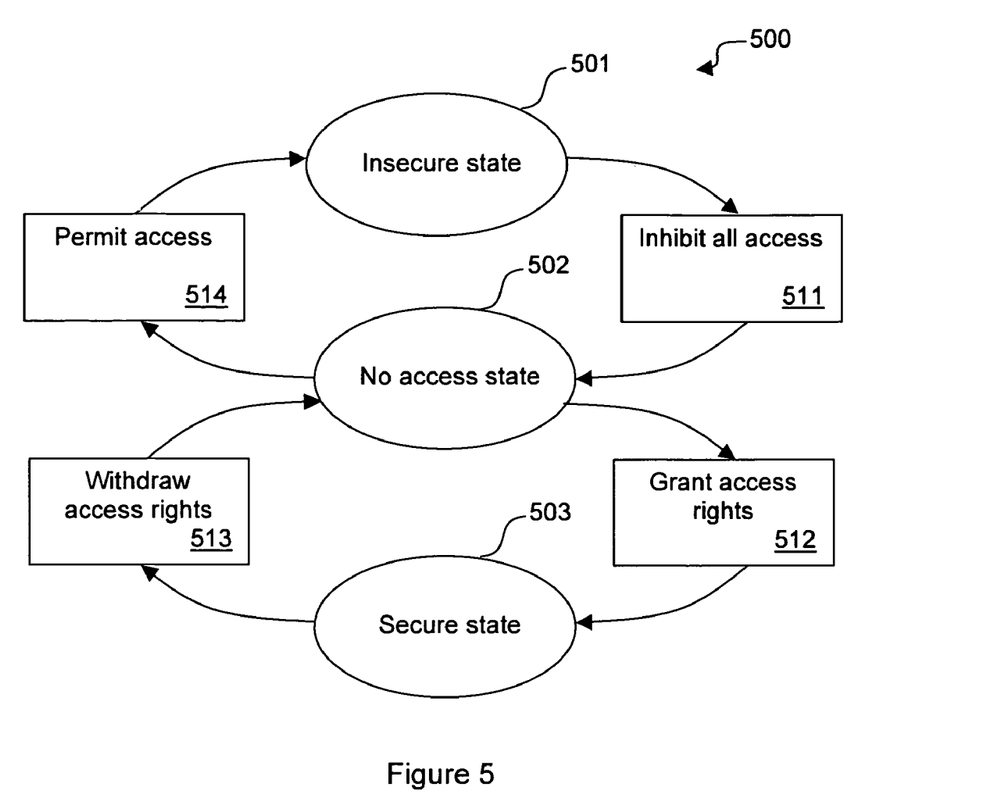
FIG. 5 illustrates a state diagram of the system according to a preferred embodiment of the invention.

FIG. 5 illustrates a state diagram 500 of the system according to a preferred embodiment of the invention. In the initial, insecure state 501, there is no security according to the invention in the system. In step 511, an administrator inhibits all access to either the entire devices or parts or services of the devices in the system (except, if needed, his own access to the system in order to perform the changes). The services of a device may for example be: use of the disk drive, use of a digital interface (such as for example a USB interface, a WIFI® card or a Bluetooth® adapter card), access to a certain programme, or combinations thereof. At this point, in the no access state 502 no one has any access to the services.

From the no access state 502, the administrator can either permit access again in step 514 and return to the insecure state 501, or grant access rights 512, after which the system is in the secure state 503. At this point, only users who have been granted access to the services have access to them.

Finally, the way out of the secure state 503 is for the administrator to withdraw the granted access rights; step 513. It should however be noted that access rights may be modified for individual users (or new users may be added etc.) without leaving the secure state 503.

Figure 6:
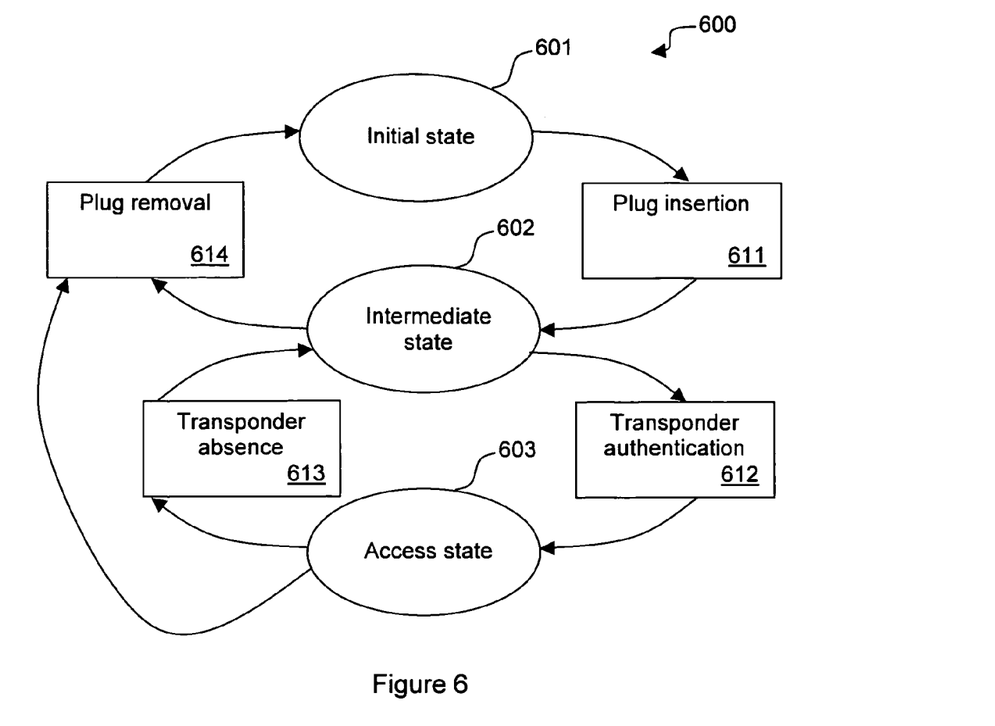
FIG. 6 illustrates a service access state diagram according to a preferred embodiment of the invention.

FIG. 6 illustrates a service access state diagram 600 according to a preferred embodiment of the invention. In the initial state 601 (which corresponds to the secure state 503 in FIG. 5), when a user wants to access a service to which he has access rights, he plugs his plug 140 into a device 120, 130; step 611. This brings the system into the intermediate state 602. If the user removes his plug 140, the state returns to the initial state 601, but if the transponder 150 is present (preferably on the user's person) and authenticated by the plug 140, step 612, then the user may access the services to which he has access rights; access state 603. The user may continue to use the service until he removes the plug 140, step 614, or until the transponder 150 is removed far enough from the plug 140 so as to break the connection 160, step 613, leading to the initial state 601 and the intermediate state 602, respectively.

The authentication may be performed using any suitable authentication algorithm known in the art, such as for example a Secure Sockets Layer (SSL) algorithm, preferably using the keys 141, 151 stored in the memories 144, 154 of the plug 140 and the transponder 150, respectively.

Furthermore, if the plug 140 is identified with the access manager 110, the plug 140 may be authenticated by the access manager 110 using the same (or a different) authentication algorithm as the plug's 140 authentication of the transponder 150.

Figure 7:
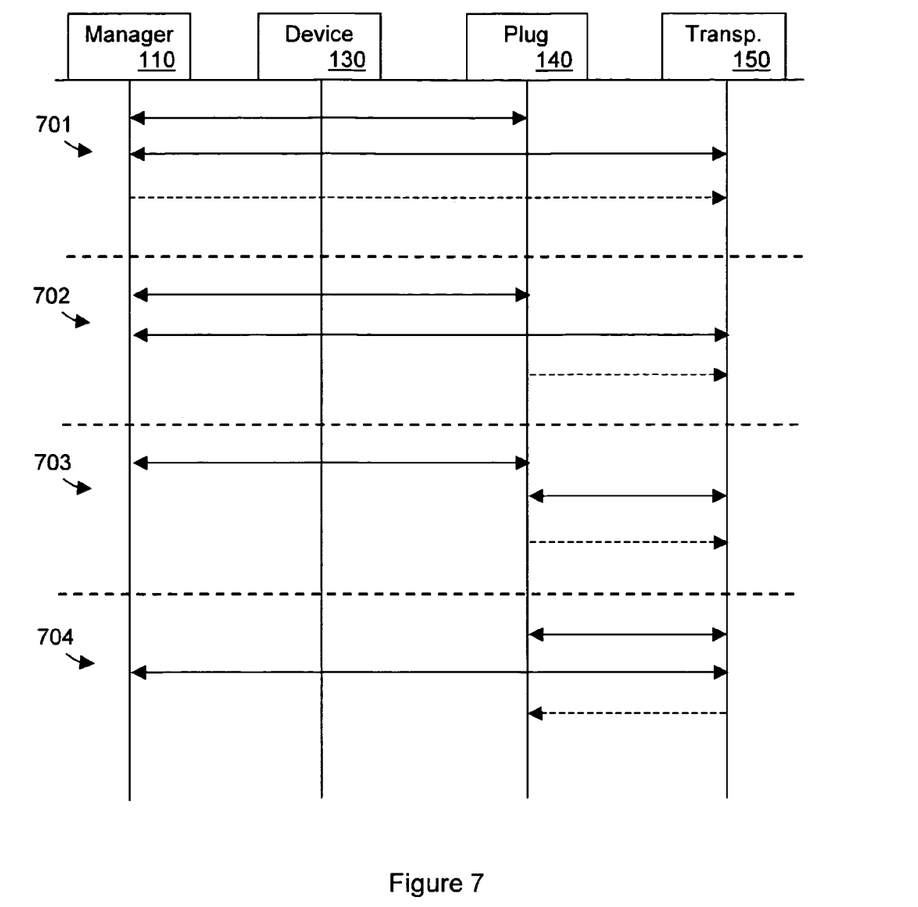
FIG. 7 schematically illustrates a number of embodiments of the invention when a transponder and a plug are paired.

FIG. 7 schematically illustrates a number of embodiments of the invention when a transponder and a plug are paired.

In the first embodiment 701, the access manager 110 receives information about the plug 140 and the transponder 150 allowing the identification and/or authentication of the two. The access manager 110 then verifies if the plug 140 and the transponder 150 are paired, for example by looking up a list of paired plugs and transponders, or by verifying that both provide proof that they share a secret (such as for example keys 141, 151). Thus, the access manager 110 will not authenticate a transponder 150 whose data is forwarded by a non-corresponding plug 140.

In the second embodiment 702, the plug 140 filters transponder states and only forwards information relating to a transponder 150 with which it is paired. The access manager 110 then authenticates the transponder 150.

In the third embodiment 703, the plug 140 verifies that it is paired with the transponder 150 and forwards information to the access manager 110 only if the verification is successful. The plug 140 thus authenticates the transponder 150 and is in turn authenticated by the access manager 110.

In the fourth embodiment 704, the transponder 150 authenticates the plug 140 before being authenticated by the access manager 110, which only authenticates the transponder 150.

In case additional security is required, the access manager 110 may require more than one transponder 150 to be present and authenticated before any access rights are provided. In this case, it is possible for a single plug 140 to communicate with a plurality of transponders 150, for a plurality of plugs, each corresponding to a transponder, to be inserted into the device 120, 130, or a combination thereof.

Furthermore, for traceability purposes the access manager 110 may keep a log of events, such as for example:
- presence/absence of transponders, including failed authentications;
- insertion/removal of plugs, including failed authentications, if any;
- pairing problems;
- granted allowed services; and
- the use of the allowed services, such as for example a list of the files that were transferred on an authorised digital interface.

It will be understood that the present invention has been described purely by way of example, and modifications of detail can be made without departing from the scope of the invention. In particular, a person skilled in the art will appreciate that the present invention is not limited to computers, but that it can be used with practically any kind of apparatus for which access rights are an issue, such as for example:
- Cars where the user plugs the plug into the ignition and keeps the transponder on him to counter thefts where the driver leaves the car momentarily. To further increase security, the transponder may require biometric identification to work, something that would counter thefts where the thief forces the driver to hand over the transponder or where the thief steals the transponder during a break-in.
- Mobile phones where the plug is integrated in the phone itself, something that makes the use of a stolen phone much more difficult.
- Medical equipment that should only be used by an authorised nurse.
- Maintenance of any dedicated remote system that requires the presence of an authorised person during the operation.

Each feature disclosed in the description and (where appropriate) the claims and drawings may be provided independently or in any appropriate combination. Features described as being implemented in hardware may also be implemented in software, and vice versa. Connections may, where applicable, be implemented as wireless connections or wired, not necessarily direct or dedicated, connections.

Reference numerals appearing in the claims are by way of illustration only and shall have no limiting effect on the scope of the claims.

The invention claimed is:

1. A system for controlling access to a service, the system comprising:
   a device;
   a plug being adapted for insertion in the device;
   a transponder being adapted for communication with the plug;
   wherein the plug and the transponder are paired; and
   an access manager being adapted to provide access to the service upon successful verification that the plug is inserted in the device, that the transponder is in presence of the plug, that the transponder is authorized for access to the service, that the plug is authorized for access to the service, and that the plug and the transponder are paired.

2. The system according to claim 1, wherein the transponder and the plug are adapted to be carried upon a user without encumbrance or bother to the user.

3. The system according to claim 2, wherein the transponder and the plug are adapted to be joined securely, and easily separated once thus joined.

4. The system according to claim 1, wherein the transponder is in presence of the plug as long as the plug repeatedly receives a signal from the transponder before a specified time interval lapses.

5. The system according to claim 4, wherein the transponder sends a signal to the plug in response to a request from the plug.

6. The system according to claim 4, wherein the signal sent from the transponder to the plug is a radio signal.

7. The system according to claim 1, wherein the transponder comprises an identification interface that requires user identification before communication with the plug.

8. The system according to claim 1, wherein the plug comprises an identification interface that requires user identification before communication with the transponder and/or the access manager.

9. The system according to claim 1, wherein the plug is adapted to provide the verification of the presence of the transponder to the access manager.

10. The system according to claim 1, wherein the access manager is adapted to verify the presence of a plurality of authorized transponders before providing access to the service.

11. A method for controlling access to a service on a device in a system, the system further comprising an access manager, a plug, and a transponder, the transponder being adapted for communication with the plug, the method comprising:
verifying:
that the plug is inserted in the device;
that the transponder is in presence of the plug;
that the transponder is authorized for access to the service ;
that the plug and the transponder are paired; and
that the plug is authorized for access to the service; and,
upon successful verification, providing access to the service.

12. The method according to claim 11, further comprising the step of providing to the access manager from the plug the verification that the transponder is in presence of the plug.

13. The method according to claim 11, further comprising the step, at the transponder, of requiring user identification before establishing presence with the plug.

14. The method according to claim 11, further comprising the step, at the plug, of requiring user identification before detecting presence of the transponder.

15. A computer program product for providing access to a service in a system, the system having a device, a plug, and a transponder, the computer program product embodied on a non-transitory computer-readable media comprising:
an access manager program configured to communicate with the device, the plug and the transponder, the access manager program adapted to verify:
that the plug is inserted in the device,
that the transponder is authorized for access to the service,
that the transponder is in presence of the plug,
that the plug is authorized for access to the service,
that the plug and the transponder are paired, and
upon successful verification, provide access to the service.

16. The computer program product according to claim 15, wherein the access manager is adapted to receive from the plug verification that the transponder is in presence of the plug.

17. The computer program product according to claim 15, wherein the access manager is adapted to verify the presence of a plurality of authorized transponders before providing access to the service.

* * * * *